US008711335B2

(12) United States Patent
Sogard

(10) Patent No.: US 8,711,335 B2
(45) Date of Patent: Apr. 29, 2014

(54) STROBOSCOPIC LIGHT SOURCE FOR A TRANSMITTER OF A LARGE SCALE METROLOGY SYSTEM

(75) Inventor: Michael Sogard, Menlo Park, CA (US)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/533,775

(22) Filed: Jun. 26, 2012

(65) Prior Publication Data

US 2013/0003042 A1 Jan. 3, 2013

Related U.S. Application Data

(60) Provisional application No. 61/502,245, filed on Jun. 28, 2011.

(51) Int. Cl.
*G01P 3/40* (2006.01)
(52) U.S. Cl.
USPC ............................................. 356/23
(58) Field of Classification Search
USPC ............ 356/23, 236, 213, 218; 250/205, 228; 362/231, 84, 247, 259
See application file for complete search history.

(56) References Cited

U.S. PATENT DOCUMENTS

| | | | | |
|---|---|---|---|---|
| 4,309,746 A | * | 1/1982 | Rushworth | 362/259 |
| 4,395,126 A | * | 7/1983 | Kramer | 356/417 |
| 4,868,383 A | * | 9/1989 | Kurtz et al. | 250/228 |
| 4,921,351 A | * | 5/1990 | Kohigashi et al. | 356/323 |
| 4,968,143 A | * | 11/1990 | Weston | 356/328 |
| 5,247,487 A | | 9/1993 | Beliveau | |
| 5,340,974 A | * | 8/1994 | Zalewski | 250/205 |
| 5,537,203 A | | 7/1996 | Carr | |
| 5,771,109 A | * | 6/1998 | DiFrancesco | 358/501 |
| 6,222,172 B1 | * | 4/2001 | Fossum et al. | 250/205 |
| 6,452,668 B1 | | 9/2002 | Pratt | |
| 6,501,543 B2 | | 12/2002 | Hedges | |
| 6,630,993 B1 | | 10/2003 | Hedges | |
| 7,339,665 B2 | * | 3/2008 | Imura | 356/243.1 |
| 7,532,324 B2 | * | 5/2009 | Liu et al. | 356/326 |
| 7,710,559 B2 | * | 5/2010 | Imura | 356/243.8 |

OTHER PUBLICATIONS

Nikon iSpace brochure, Large volume metrology, tracking and positioning, 2010, 6 pages, http://www.nikonmetrology.com/tlcharger/brochures/iSpace_EN_0411, © Nikon Metrology NV 2010, Applicants admit this is prior art.

Nikon iSpace brochure, Turning your excavation area into a metrology lab, 2011, 4 pages, http:/www.Archeololgy_Space_EN_0311, © Nikon Metrology NV 2011, Applicants admit this is prior art.

(Continued)

*Primary Examiner* — Sang Nguyen
(74) *Attorney, Agent, or Firm* — Roeder & Broder LLP

(57) ABSTRACT

A stroboscopic light source (22) for a transmitter (14) of a metrology system (10) the monitors the position or shape of an object (12) includes a source housing (224) and a pulsed light generator (232). The stroboscopic light source (22) emits a pulsed beam (20) that is used to identify the transmitter (14). The source housing (224) defines a housing cavity (226) and includes an inlet port (228) and one or more outlet ports (230). The pulsed light generator (232) generates the pulsed beam (20) that is directed into the housing cavity (226) via the inlet port (228). Subsequently, the pulsed beam (20) emits from the outlet ports (230) of the source housing (224).

20 Claims, 14 Drawing Sheets

(56) References Cited

OTHER PUBLICATIONS

Nikon Metrology Solutions brochure, 2010, 44 pages, http://www.nikonmetrology.com/tlcharger/brochures/Nikon_Metrology_Solutions_EN_04111, Copyright Nikon Metrology NV 2010, Applicants admit this is prior art.

Nikon Industrial Measuring Instruments brochure, Measuring success with Nikon, 2010, 12 pages, http://www.nikonmetrology.com/tlcharger/brochures/Vision Measuring Instruments,Copyright Nikon Metrology NV 2010, Applicants admit this is prior art.

Nikon Laser Radar MV3301350 brochure, Automated large volume inspection, 2010, 6 pages, http://www.Laser_Radar_EN_10-10, © Nikon Metrology NV 2010, Applicants admit this is prior art.

Hamamatsu, PSD (Position Sensitive Detector) Jul. 2003, 16 pages, Cat. No. KPSD0001E01, Solid State Div., Copyright 2003 Hamamatsu Photonics K.K., Homepage:www.hamamatsu.com, Applicants admit this is prior art.

Hamamatsu Photonics, Photodiode, Si PIN photodiode S4349, Quadrant SI PIN photodiode, Aug. 2006, 2 pages, Cat. No. KMPD1007E02, Solid State Div., Copyright 2006 Hamamatsu Photonics K.K., Homepage: www.hamamatsu.com, Applicants admit this is prior art.

* cited by examiner

US 8,711,335 B2

STROBOSCOPIC LIGHT SOURCE FOR A TRANSMITTER OF A LARGE SCALE METROLOGY SYSTEM

RELATED APPLICATION

The application claims priority on Provisional Application Ser. No. 61/502,245 filed on Jun. 28, 2011, entitled "STROBOSCOPIC LIGHT SOURCE FOR A TRANSMITTER OF A LARGE SCALE METROLOGY SYSTEM". As far as is permitted, the contents of U.S. Provisional Application Ser. No. 61/502,245 are incorporated herein by reference.

BACKGROUND

Large scale metrology systems are used to monitor the position or shape of one or more objects during an assembly or manufacturing procedure. There is an ever increasing need to improve the accuracy and performance of the metrology system, reduce the cost of the metrology system, and simplify the design of the metrology system.

One type of large scale metrology system utilizes one or more transmitters located at a known position(s), and one or more receivers that are attached to an object whose location is to be determined. In this type of system, each transmitter can include a light beam generator that generates a pair of moving fan beams, and a strobe light generator that generates a strobe light pulse that is used for determining which transmitter is generating the fan beams. With this design, the distance and direction of the object relative to the transmitter can be determined from when the fan beams impinge on the receivers.

Unfortunately, existing strobe light generators are complex, have relatively slow rise times, and may not generate a uniform beam array. This can lead to azimuthal time slewing errors and a significant amount of calibration. Accordingly, existing strobe light generators are not completely satisfactory.

SUMMARY

The present invention is directed to a stroboscopic light source for a transmitter of a metrology system that monitors the position of an object. In one embodiment, the stroboscopic light source emits a pulsed beam, and includes a source housing and a pulsed light generator. The source housing defines a housing cavity and includes an inlet port and one or more outlet ports. The pulsed light generator generates a pulsed beam that is directed into the housing cavity via the inlet port, the pulsed beam emits from the outlet ports of the source housing. In certain embodiments, the present invention is relatively simple to manufacture, align and operate. Further, this simpler design should have a much higher intrinsic azimuthal symmetry as well as a faster rise time.

As provided herein, the pulsed light generator can include a fast pulse laser diode array. Additionally, the system can include an optical fiber that transmits the pulsed beam from the pulsed light generator to the inlet port.

In one embodiment, the housing cavity is substantially spherical shaped. Moreover, the source housing can include an azimuthal array of outlet ports. Alternatively, the outlet port can include an azimuthal slit in the source housing. Moreover, the source housing can include an internal baffle.

Additionally, the transmitter can include a fan beam generator that generates a pair of moving fan beams.

Moreover, the present invention is directed to a metrology system that monitors the position of an object, the metrology system comprising: a target adapted to be secured to the object, and the transmitter disclosed herein.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
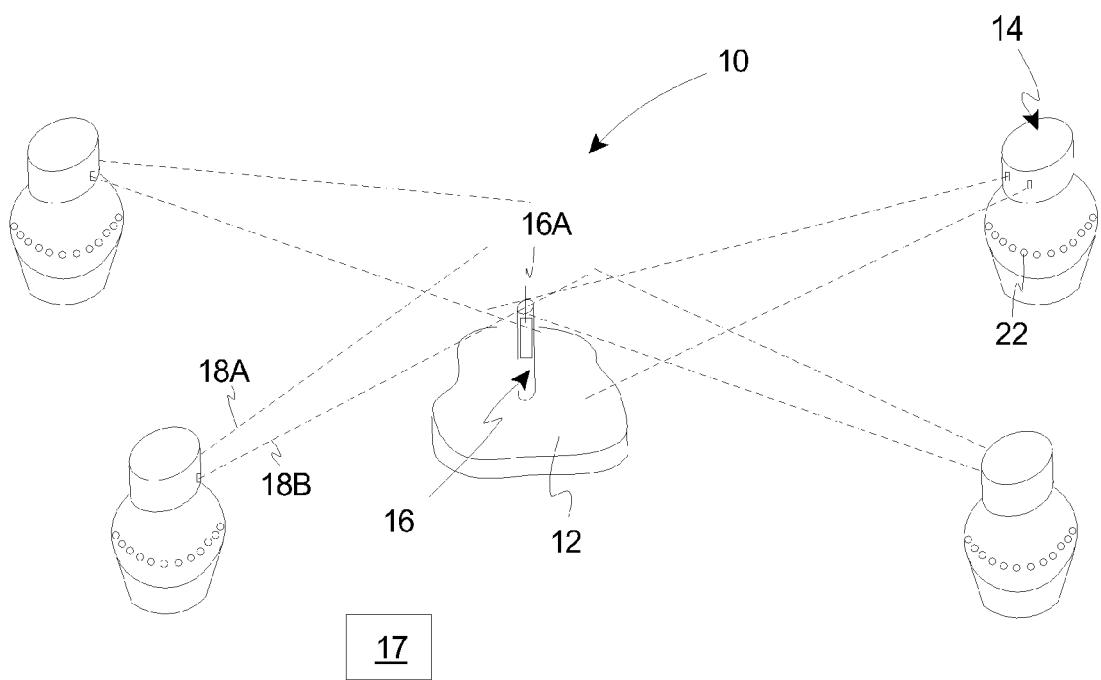
FIG. 1A is a perspective view of a metrology system having features of the present invention that monitors the position of an object.

The present invention is directed to a large metrology system 10 for monitoring the position or determining the shape of an object 12 (e.g. a mechanical structure) during a manufacturing, inspection, or assembly process, for example. In one embodiment, the metrology system 10 includes (i) one or more transmitters 14, (ii) one or more targets 16 (usually multiple targets 16 are used for each object 12) that are attached to or positioned nearby the object 12, and (iii) a control system 17 that receives information from the targets 16 and determines the position of the targets 16 relative to the transmitters 14. Each target 16 can include one or more photodetectors 16A.

In certain embodiments, each transmitter 14 is uniquely designed to improve the positional accuracy of the system 10. More specifically, each transmitter 14 can include a strobe light source 22 having a relatively fast rise time, having a relatively high intrinsic azimuthal symmetry, and that is relatively simple in design. This improves the accuracy of the metrology system 10.

A metrology system 10 having features of the present invention (without the improvements to the transmitter 14) is sold by Nikon Metrology under the trademark "iGPS". A metrology system 10 is described in, for example, U.S. Pat. No. 6,452,668, U.S. Pat. No. 6,501,543, U.S. Pat. No. 6,630,993, and U.S. Pat. No. 5,247,487. As far as permitted, the contents of U.S. Pat. No. 6,452,668, U.S. Pat. No. 6,501,543, U.S. Pat. No. 6,630,993, and U.S. Pat. No. 5,247,487 are incorporated herein by reference.

In FIG. 1A, the system 10 includes four spaced apart transmitters 14 that are used to determine the position of the target 16 and the object 12. Generally speaking, the positional accuracy improves as the number of transmitters 14 and/or targets 16 is increased. In one embodiment, each transmitter 14 generates two moving beams 18A, 18B. Alternatively, the transmitter 14 can generate more than two or fewer beams.

The control system 17 receives signals from the photodetector(s) 16A on the target(s) 16. With this design, the control system 17 can individually determine when each beam 18A, 18B is incident on each target 16. Further, the control system 17 controls the operation of each transmitter 14. The control system 17 can include one or more processors. In FIG. 1A, the control system 17 is illustrated as a centralized system positioned away from the other components. Alternatively, the control system 17 can be a decentralized system with processors positioned in the targets 16 and/or the transmitters 14.

Figure 1B:
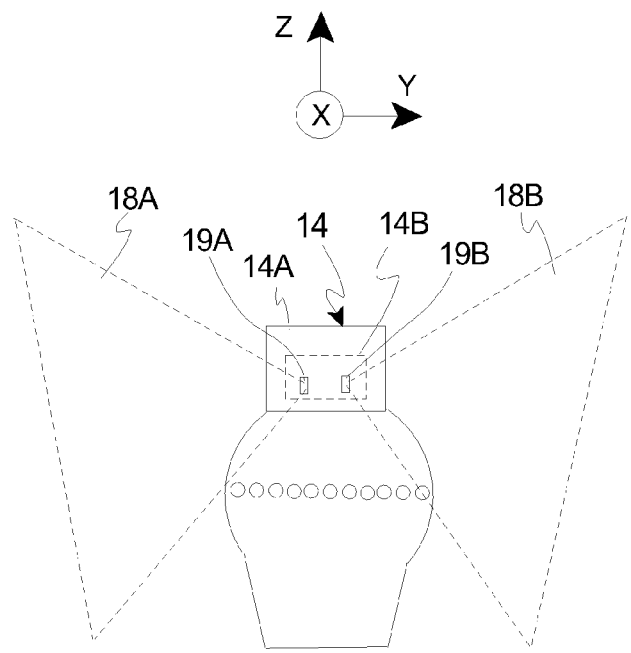
FIG. 1B is a front view of a transmitter from the metrology system of FIG. 1A.

FIG. 1B is a front plan view of one of the transmitters 14. In this embodiment, the transmitter 14 includes a transmitter head 14A having a beam generator 14B (illustrated as a box in phantom) that generates the pair of beams 18A, 18B. More particularly, as illustrated, the transmitter head 14A can include a first head aperture 19A and a second head aperture 19B, such that one of the moving beams 18A is emitted through the first head apertures 19A and the other moving beam 18B is emitted through the second head aperture 19B. In this embodiment, during operation, the transmitter head 14A is rotating so that the beams 18A, 18B are rotating approximately about the Z axis. Stated in another fashion, the place where the beams 18A, 18B are emitting is rotated approximately about the Z axis so that the beams 18A, 18B are rotating. The rate of rotation of each of the transmitters 14 can be different.

In one non-exclusive embodiment, each of the beams 18A, 18B is a somewhat planar shaped beam, each beam 18A, 18B lies in a different plane, and each beam 18A, 18B can be referred to as a fan beam. Further, in FIG. 1B, the beams 18A, 18B are angled relative to each other vertically (e.g. tilted inward from top to bottom). With this design, the beams 18A, 18B lie in planes that are at an angle relative to the Z axis, and the bottom of the beams 18A, 18B are closer together than the top of the beams 18A, 18B. Further, the beams 18A, 18B are emitted from the transmitter 14 separated by a fixed azimuthal angle, and the beams 18A, 18B are limited in vertical extension by upper and lower elevation angles. Alternatively, the orientation of the beams 18A, 18B can be different than that illustrated in FIG. 1B.

Figure 1C:
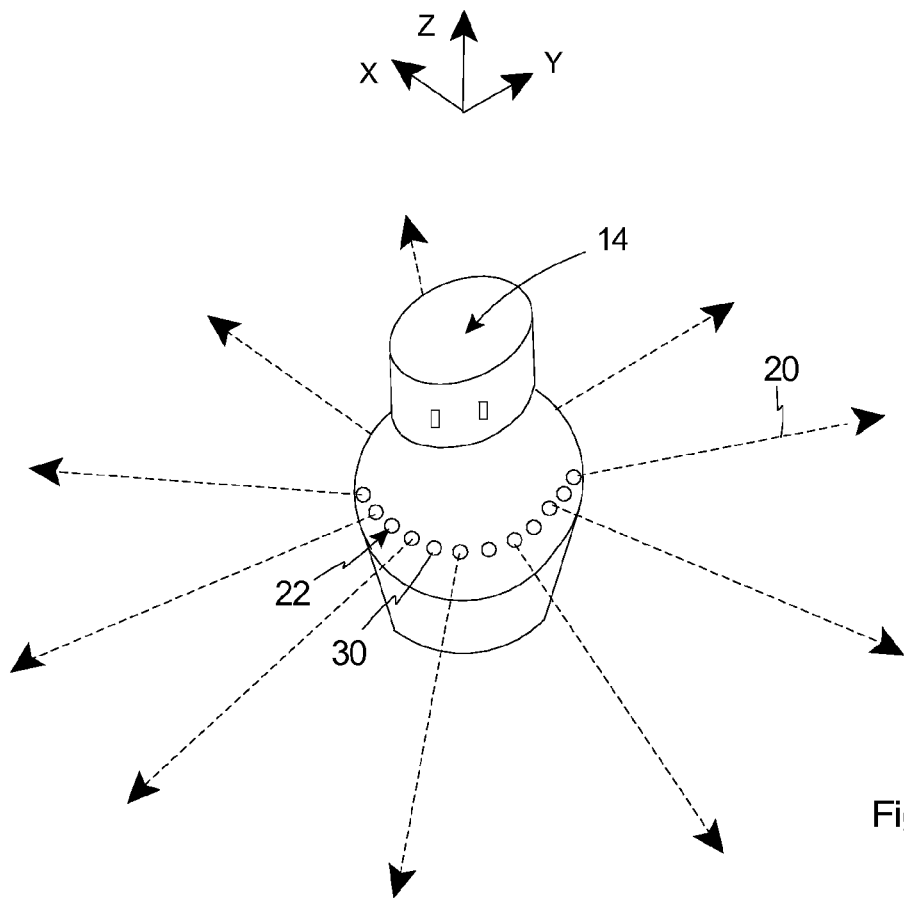
FIG. 1C is a perspective view of the transmitter of FIG. 1B.

FIG. 1C is a perspective view of the transmitter 14. As provided herein, the transmitter 14 includes a strobe pulse source 22 that generates an azimuthal pulse (flash) of light 20 at predetermined time intervals. More specifically, the light pulse intensity is ideally independent of the azimuthal angle and is approximately centered in the azimuthal plane. It is limited in vertical extension by upper and lower elevation angles. Moreover, the strobe pulse source 22 for each transmitter 14 can generate the flash of light 20 at a different predetermined time interval. With this design, in certain embodiments, the pulse of light 20 is detected by the photodetectors 16A (illustrated in FIG. 1A), and is used by the control system 17 (illustrated in FIG. 1A) to determine which particular transmitter 14 is generating the fan beams 18A, 18B detected by the photo-detectors 16A.

As a non-exclusive example, the strobe pulse source 22 can generate an azimuthal strobe pulse of light 20 once every revolution of the head 14A and the pulse of light 20 is an infrared beam. In this embodiment, the predetermined time interval is tied to the rotation rate of the head 14A. For example, the strobe light source 22 can be pulsed at approximately twenty Hertz. Alternatively, the frequency of the pulses of light 20 and the wavelength of the pulses of light 20 can be different than the example provided herein.

FIG. 1C illustrates that the azimuthal pulse of light 20 is emitted from around the horizontal center circumference of the transmitter 14. In this embodiment, the strobe light source 22 includes a plurality of outlet ports 30 that are equally spaced apart around a circumference of the strobe light source 22. In FIG. 1C, only a portion of the pulse of light 20 is illustrated. Instead, in certain embodiments, light 20 is emitted from each of the outlet ports 30. With this design, the pulse of light 20 includes a plurality of rays that emit radially around the circumference of the strobe light source 22.

Figure 1D:
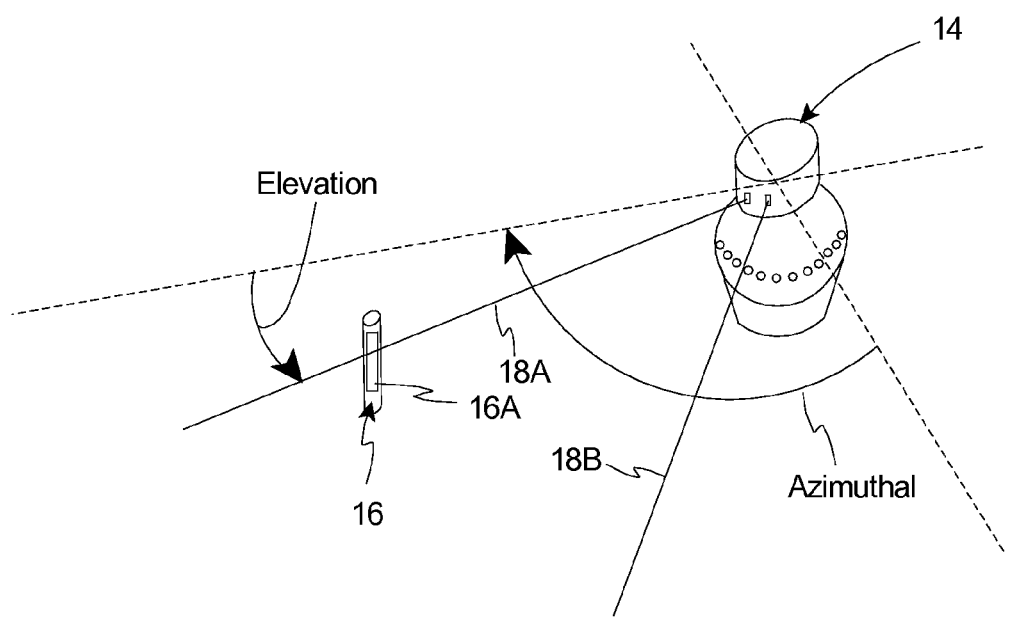
FIG. 1D is a perspective view of the transmitter and a target of the metrology system of FIG. 1A.

FIG. 1D illustrates one target 16 and one transmitter 14 that can be used to determine the azimuth and elevation of the target 16 along a line relative to the transmitter 14. To determine the range, and hence the position of the object in three dimensions, more than one transmitter 14 is needed in this example.

In this example, the control system 17 (illustrated in FIG. 1A) can analyze the signals from the target 16 to determine the azimuth and elevation of the detector 16A. The azimuth, or azimuthal angle, and elevation are defined relative to a polar coordinate system, whose z-axis coincides with the rotation axis of the fan beams 18A, 18B. In this example, the azimuthal plane, defined by z=0, is located approximately at the midpoint of the fan beams' 18A, 18B vertical range. The azimuth is defined relative to the direction of the fan beams 18A, 18B at the time of the azimuthal strobe pulse. This direction also defines the direction of the x axis of a Cartesian coordinate system, whose z axis coincides with the z-axis of the polar coordinate system. The height, or elevation, of each photodetector 16A relative to the azimuthal plane is determined from the time interval between arrival of the first fan beam 18A at the center of each photodetector 16A and the arrival of the second fan beam 18B, as well as the vertical angle between the fan beams 18A, 18B. The elevation angle e of the photodetector 16A is given by $e = \arcsin(\text{height}/R)$, where R is the distance from the origin (sometimes referred to as the "range") of the transmitter's polar coordinate system to the center of the detector.

With the design of the target 16, more than one transmitter 14 is needed to determine the range and other positional information of the target 16. Moreover, the use of additional transmitters 14 and/or signals from additional detectors 16A will improve the accuracy of the measurement.

Referring to FIGS. 1A-1D, with the present design, the metrology system 10 can be used to measure the distance and orientation (with additional targets) of mechanical structures 12. Alternatively, the metrology system 10 can be used to measure the shape of a mechanical structure 12 by moving the target 16 and/or through the use of multiple targets 16.

Targets 16 can be positioned (e.g. mounted) at specific locations on the structures 12. The distance from the photodetector(s) 16A location to the contact position with the structure 12 is known. Depending upon the location of the structure 12, the rotating laser fan beams 18A, 18B from multiple transmitters 14 can scan across the target 16. For each transmitter 14, the direction of the fan beams 18A, 18B are known as a function of time. When the fan beams 18A, 18B sweep across the photodetector(s) 16A on the target 16, it generates a signal whose time defines the direction of the fan beams 18A, 18B (azimuth angle relative to the transmitter 14) when they impinge on the respective detector(s) 16A. The time interval between the signals from the fan beams 18A, 18B are used to determine the elevation angle relative to the transmitter 14. Based on these two angles from several transmitters 14, the position of the target 16 can be calculated. Stated in another fashion, multiple transmitters 14 at different, known locations can be used to determine the position of the target 16. Three or more transmitters 14 can be used to provide redundancy and determine the position of the target 16 with improved accuracy.

Figure 2A:
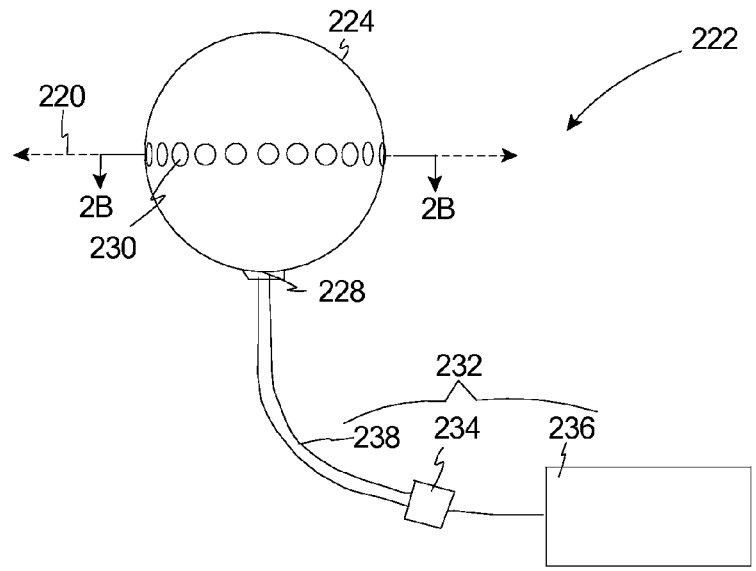
FIG. 2A is a simplified illustration of a strobe light source having features of the present invention.
Figure 2B:
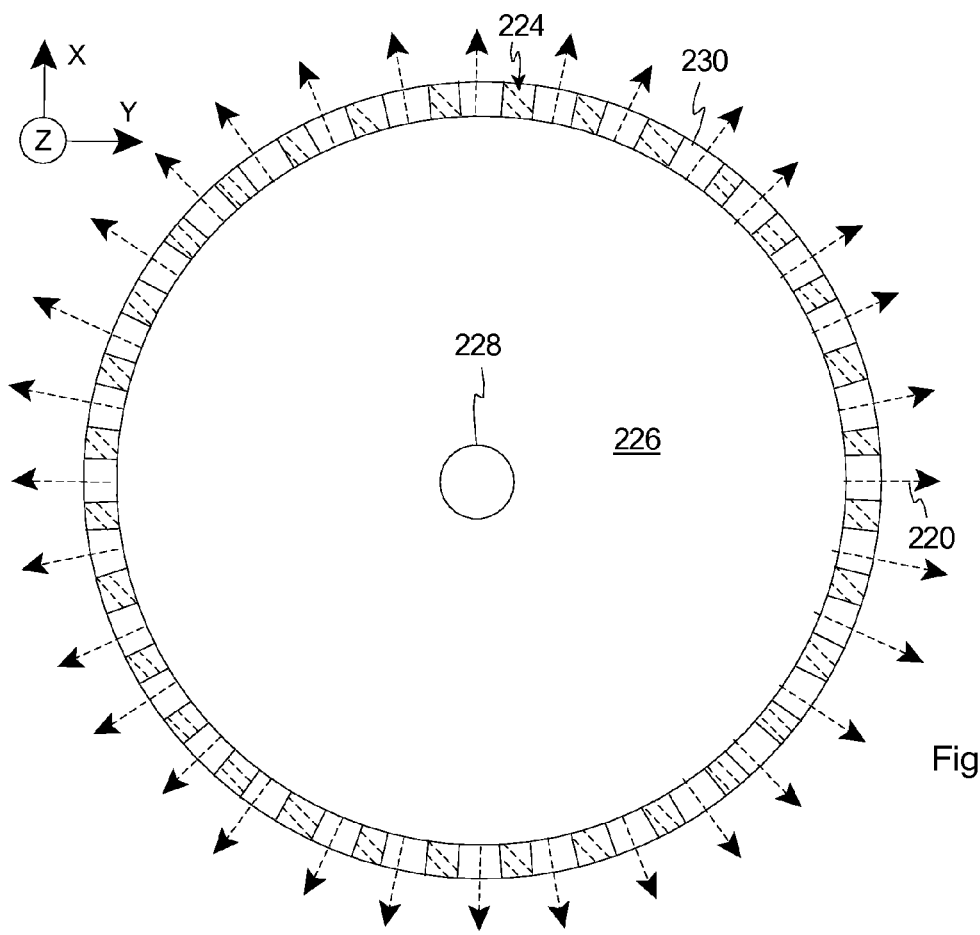
FIG. 2B is a cutaway view taken on line 2B-2B in FIG. 2A.

FIG. 2A is a simplified illustration of one embodiment of a strobe light source 222 that can be used in each of the transmitters 14 illustrated in FIGS. 1A-1D of the large scale metrology system 10 (illustrated in FIG. 1A). In this embodiment, the strobe light source 222 emits an azimuthal pulse of light 220 (only a portion of which is illustrated in FIG. 2A). FIG. 2B is an enlarged cut-away view taken on line 2B-2B in FIG. 2A. Referring to FIGS. 2A and 2B, in one embodiment, the stroboscopic light source 222 includes (i) a source housing 224 that defines a housing cavity 226, the source housing 224 including an inlet port 228, and one or more outlet ports 230; and (ii) a pulsed light generator 232 that generates the pulsed beam 220 that is directed into the housing cavity 226 via the inlet port 228, the pulsed beam 220 emitting from the one or more outlet ports 230 of the source housing 224.

In one embodiment, the source housing 224 is a hollow sphere that forms the housing cavity 226 that is generally spherical shaped. In this embodiment, the source housing 224 can be referred to as an integrating sphere. In certain embodiments, the interior surface of the source housing 224 is coated with a material providing a high diffuse reflectivity p at the wavelength of the flash of light 220. This leads to a very uniform surface radiance within the source housing 224. This radiance determines the emission at the outlet ports 230.

The size and shape of each outlet port 230 can also be varied. For example, each outlet port 230 can be a circular shaped opening having a diameter of approximately two millimeters. As provided herein, the size and shape of the outlet port(s) 230 can affect the uniformity of the light 220 exiting the source housing 220. However, this influence should not be significant if the total area of the ports is a small fraction f of the internal area of the hollow sphere. For example, if f=Σ Aport/Asphere is approximately less than 0.05 (f=Σ Aport/Asphere ~<0.05), where Aport is the area of the a port and Asphere is the area of the inner surface of the housing cavity 226 (Asphere=pi times the diameter of the inner surface squared), then the uniformity of the light should not be much affected.

In one embodiment, the outlet ports 230 are organized in an azimuthal array, with the outlet ports 230 being equally distributed (spaced apart and symmetric) around a circumference of the housing 224. The number of outlet ports 230 can be varied pursuant to the teachings provided herein. In the simplified embodiment illustrated in FIG. 2B, the housing 224 includes thirty-two outlet ports 230. In this example, there is approximately an eleven and one-quarter degree) (11.25°) separation between outlet ports 230. Alternatively, the number of outlet ports 230 can be greater than or fewer than thirty-two outlet ports. For example, the number of outlet ports 230 can be approximately ninety-six.

In one embodiment, the pulsed light generator 232 includes a high power pulsed laser diode (or diode array) 234, a laser diode driver 236, and an optical fiber 238 optically coupled into the source housing 224 with the array of azimuthal ports 230 to provide the strobe light 220. In this embodiment, the fiber optic 238 transmits the pulsed beam from the pulsed light generator 232 to the inlet port 228 so that the pulsed beam is emitted into the source housing 224.

In one embodiment, the pulsed laser diode array 234 has a very fast rise time (e.g. in the nanoseconds) and peak power of 100 Watts or more. Further, as one non-exclusive embodiment, the laser diode 234 can generate wavelengths of between approximately eight hundred and nine hundred nanometers, and a spectral width (fwhm) of approximately four to seven nanometers. Although the peak power is high, the pulse energy is approximately one millijoule, so heating of the source housing 224 should be minimal because of the relatively low pulse rate. For example, for a pulse rate of twenty hertz, the average power delivered to the source housing 224 is approximately twenty mill Watts.

With the present design, the source housing 224 acts as an integrating sphere so that the light source 222 creates the flash of light 220 which is very nearly isotropic within the cavity 226, so the light 220 exiting the ports 230 naturally creates the desired azimuthally symmetric strobe pulse 220. Further, the laser diode 232 connected to the integrating sphere 226 with the optical fiber 238 will simplify alignment, standardize the etendue and isolate thermal and electrical sources. An integrating sphere is described in, for example, U.S. Pat. No. 5,537,203. As far as permitted, the contents of U.S. Pat. No. 5,537,203 are incorporated herein by reference.

As a result of this design, the strobe light source 222 reduces calibration problems, complexity and timing errors associated with the azimuthal strobe pulse by producing the light 220 with the fast pulse laser diode array 234 coupled through the optical fiber 238 to the integrating source housing 224 having the azimuthal array of outlet ports 230. Moreover, the strobe light source 222 is relatively simple to manufacture, assemble, align, and maintain, and is relatively inexpensive. Further, the rise time is very fast, leading to reduced timing errors. Moreover, the azimuthal symmetry should be quite high with the strobe light source 222. Additionally, if the source 222 changes its properties over time, the strobe beam properties may change, but the azimuthal symmetry should be retained.

Figure 2C:
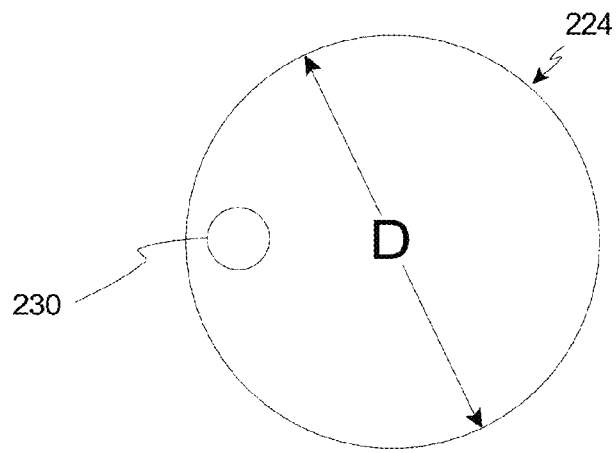
FIG. 2C is a simplified illustration of a portion of a housing having features of the present invention.

FIG. 2C is an illustration of a portion of the source housing 224 and just one of the outlet ports 230. In one embodiment, a photon entering the spherical housing 224 bounces off the inner surface until it either exits a port 230 or gets absorbed. The fraction of light exiting is controlled by the values of the reflectivity ρ and f. The multiple reflections of the light at the surface lead to some degradation of the pulse rise time, but the magnitude is typically a few nanoseconds at most.

The following Table 1 summarizes some of the formulas that can be used to make one non-exclusive embodiment of a source housing 224. In this embodiment, a light generator 230 that generates a pulse of light with a peak power of 30 Watts can produce twenty-four azimuthal pulses of light 220 exiting the source housing 224 with peak power of 367 milliwatts with a vertical angle range of plus or minus forty degrees (±40°), with seventy-one percent (71%) of the input energy into the source housing 224, exiting the source housing 224.

Figure 3A:
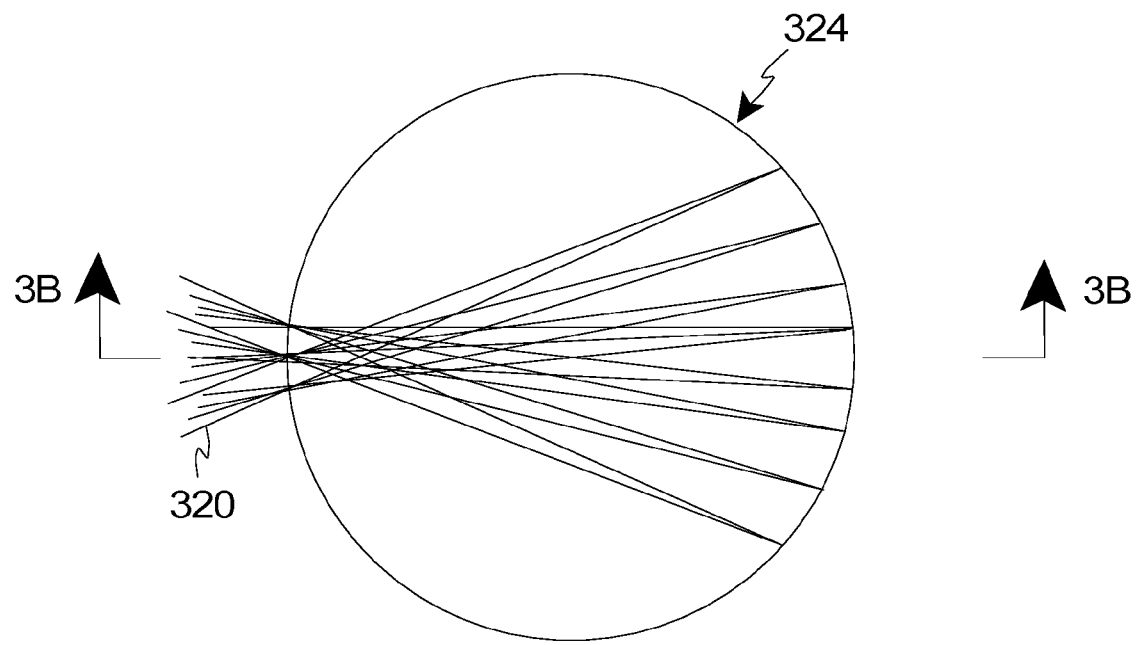
FIG. 3A is a side view and FIG. 3B is a cut-away view taken on line 3B-3B of a source housing.
Figure 3B:
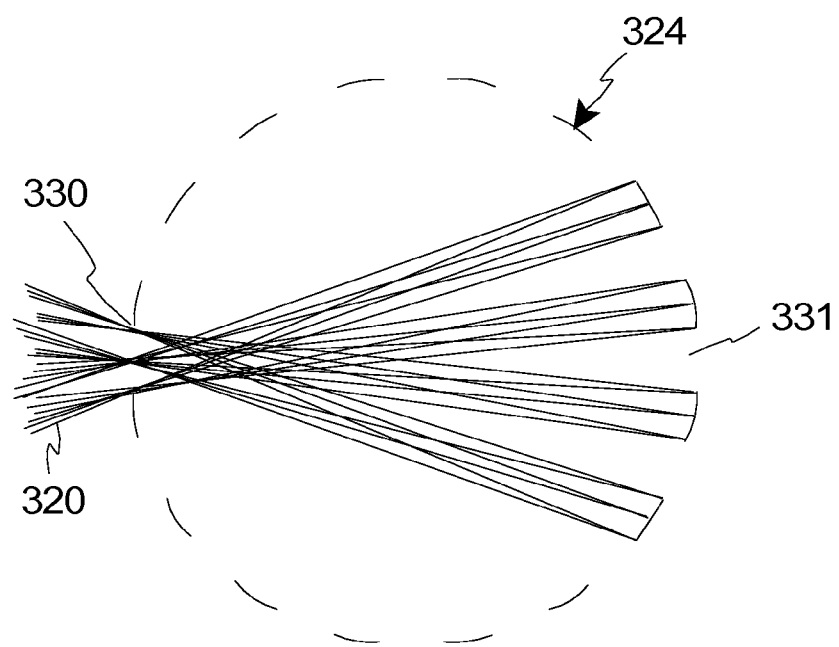
Figure 4A:
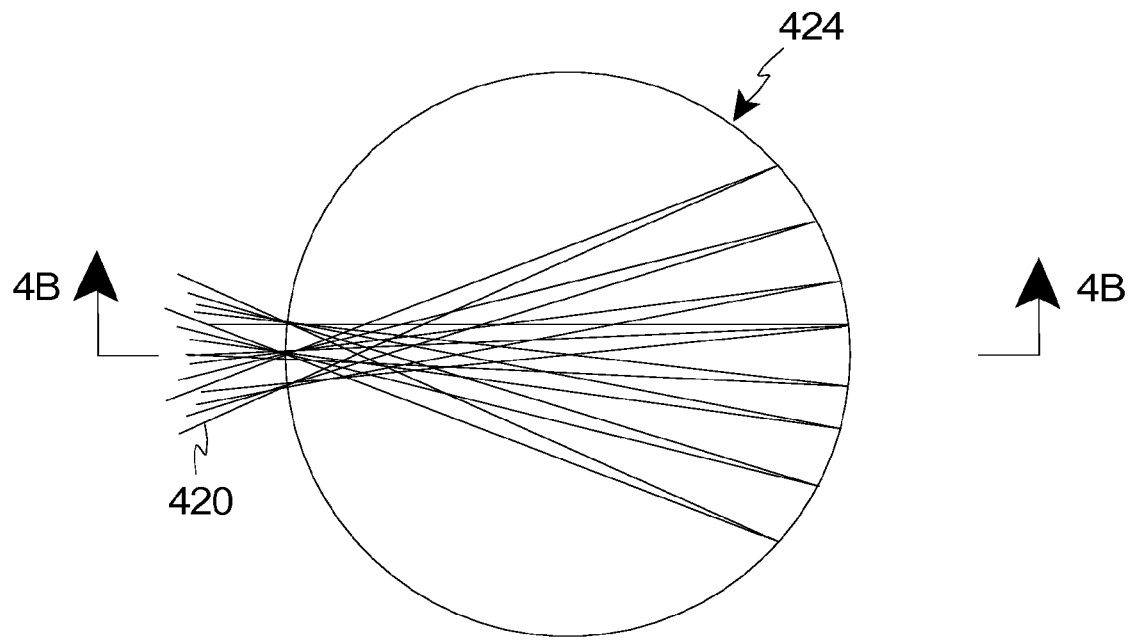
FIG. 4A is a side view and FIG. 4B is a cut-away view taken on line 4B-4B of another embodiment of the source housing.
Figure 4B:
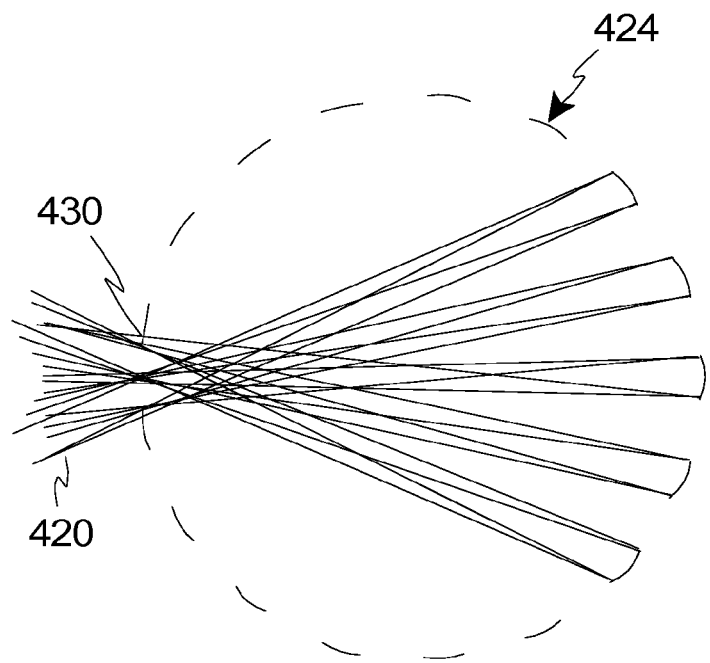

FIG. 4A is a simplified side view and FIG. 4B is a simplified cut-away view taken on line 4B-4B of yet another embodiment of the source housing 424 that is somewhat similar to the design illustrated in FIGS. 3A and 3B. However, in this embodiment, there are an odd number of outlet ports 430. As a result thereof, there are no diametrically opposite outlet ports 430. FIGS. 4A and 4B also illustrate the flash of light 420 exiting one of the outlet ports 430 (not shown in FIG. 4A). FIGS. 4A and 4B also illustrate some of the light 420 reflecting within the source housing 424. It should be noted that the light 420 again contains no contributions from

TABLE 1

| Value | Formula | Symbol | Units | Description |
|---|---|---|---|---|
| 0.98 | | rho | | OptoWhite reflectance |
| 0.06 | | D | m | sphere diameter |
| 0.011309734 | 4 * pi * D^2/4 = pi * D^2 | As | m^2 | sphere surface area |
| 30 | | phi__in | W | peak power in |
| 827.4563331 | phi__in * rho/(pi * As) | Lsurface | W/m^2-sr | surface radiance |
| 0.025 | | f | | fraction of surface open (not including laser input) |
| 18594.52434 | Lsurface/(1 − rho * (1 − f)) | Lsphere | W/m^2-sr | sphere wall radiance |
| 22.02247191 | rho/(1 − rho * (1 − f)) | M | | sphere multiplier |
| 6.59978E−09 | −2/3 * D/(c * ln(rho)) | tau | sec | sphere time constant (c = speed of light 3e8 m/sec) |
| 17 | | Nport | | no. of azimuthal ports |
| 0.011087974 | pi * D/Nport | Cport | m | port spacing |
| 21.17647059 | 360/Nport | | deg. | port angular spacing |
| 1.6632E−05 | f * As/Nport | Aport | m^2 | port area |
| 0.00460179 | sqrt(4 * Aport/pi) | Dport | m | port diameter |
| 4.394386324 | (Dport/D) * (180/pi) | th__port | deg. | angular size of port at opposite side of sphere |
| 0.006486184 | Cport − Dport | | m | space between adjacent ports |
| 0.971579643 | Lsphere * Aport * pi | phi__port | W | peak power from port into hemisphere (2pi sr) |
| 0.550561798 | rho * f/(1 − rho * (1 − f)) | | | fraction of input energy exiting sphere |
| 98.69604401 | pi^2/(4 * f) | Nmax | | adjacent ports just touch |

Figure 2D:
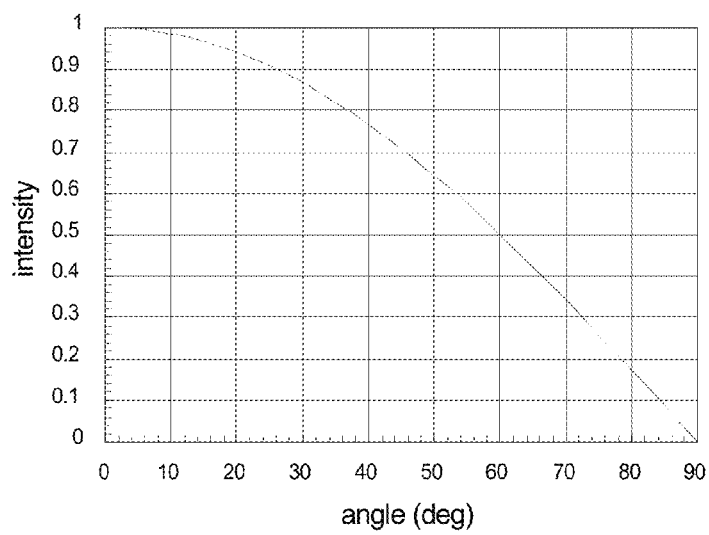
FIG. 2D is a graph that illustrates intensity of the light versus angle for a Lambertain source.
Figure 2E:
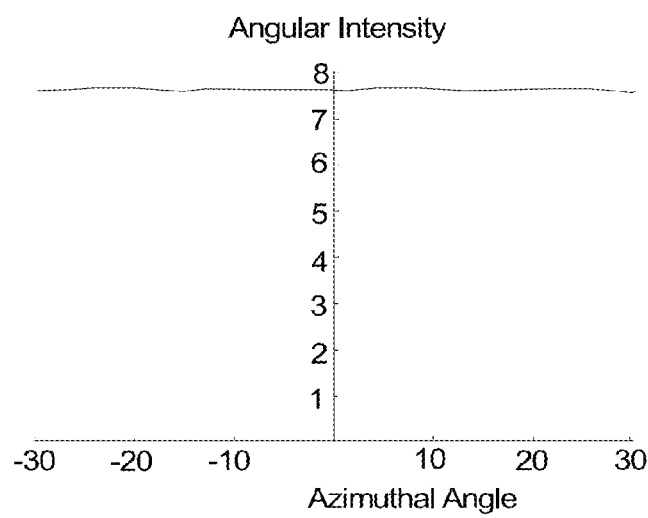
FIG. 2E is a graph that illustrates angular intensity of the light versus azimuthal angle.

The angular distribution of the radiation from each outlet port 230 should be Lambertian to a good approximation, i.e. the intensity angular distribution I(θ) is approximately I(θ)∝ cos θ, as shown in FIG. 2E, as long as the outlet ports 230 are small, i.e. as long as the fraction f of the total area represented by the ports is approximately 0.05 or smaller. There can be some impact on this distribution from the radiation from the other azimuthal outlet ports 230. For example, as shown in FIG. 2D, the far field azimuthal intensity from all the contributing outlet ports 230 has a modulation of approximately four tenths of a percent (0.4%) for the case of twenty-four outlet ports 230 (with a fifteen degree separation between outlet ports 230), assuming a Lambertian intensity distribution from each port.

As provided above, in certain embodiments, the multiple outlet ports 230 may affect the angular distribution of the flash of light 220. For example, if an outlet port 230 is diametrically opposite from another outlet port 230, there may be a decrease in the central part of the angular distribution of the light 220.

FIG. 3A is a simplified side view and FIG. 3B is a simplified cut-away view taken on line 3B-3B of another embodiment of the source housing 324. More specifically, FIGS. 3A and 3B illustrate some of the light rays making up the flash of light 320 exiting one of the outlet ports 330 (not shown in FIG. 3A). FIGS. 3A and 3B also illustrate some of the light 320 reflecting within the source housing 324. It should be noted that the light 320 does not contain contributions from the areas of the other outlet ports 330. In this case an even number of ports are used, and one port is diametrically opposite. Thus, in this embodiment, light 320 contains no contribution from the side directly opposite the labeled outlet port 330 because there is an outlet port 331 directly opposite the labeled outlet port 330.

the areas of the other outlet ports 430. In this embodiment, light 420 does have a contribution from directly opposite the labeled outlet port 430 because there is no outlet port 430 directly opposite the labeled outlet port 430. The presence of additional ports will reduce the intensity from a given port because of the absence of light from the areas of the spherical surface occupied by the other ports. This creates local intensity minima in the far field azimuthal plane.

Figure 5:
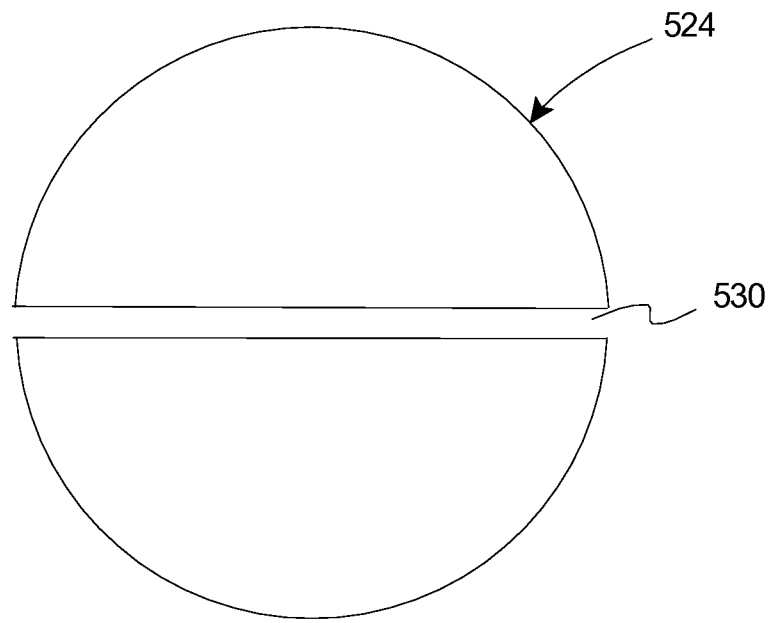
FIG. 5 is a simplified side view of another embodiment of a source housing having features of the present invention.

FIG. 5 is a simplified illustration of another embodiment of a source housing 524 that is somewhat similar to the source housing 224 described above and illustrated in FIGS. 2A and 2B. In this embodiment, the source housing 524 is again hollow spherical shaped. However, in this embodiment, the source housing 524 includes a single outlet port 530 that is an azimuthal, zonal slice that allows for the pulse of light (not shown) to exit the housing 524 around the circumference. This configuration provides very good axial symmetry. However, the azimuthal pulse intensity will have a minimum in the azimuthal plane.

Figure 6:
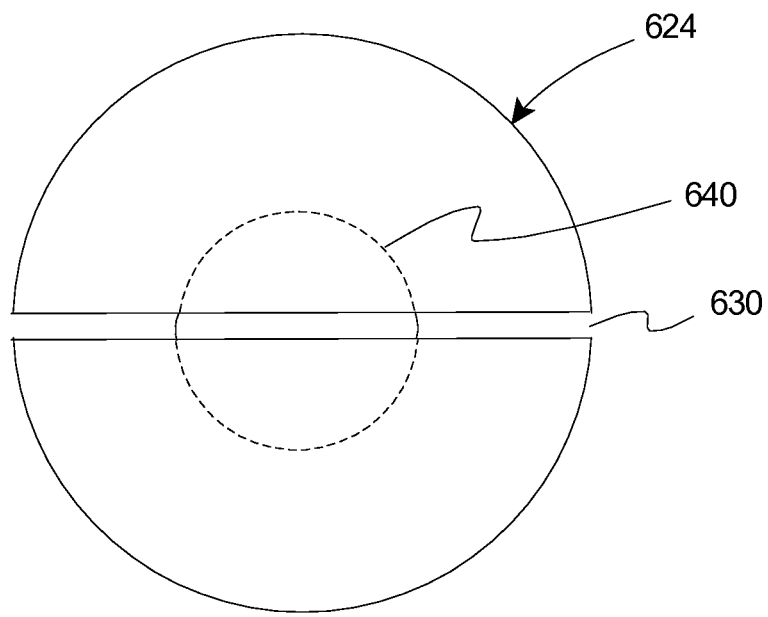
FIG. 6 is a simplified side view of yet another embodiment of a source housing having features of the present invention.

FIG. 6 is a simplified illustration of yet another embodiment of a source housing 624 that is somewhat similar to the source housing 524 described above and illustrated in FIG. 5. In this embodiment, the source housing 624 is again hollow spherical shaped and includes a single outlet port 630 that is an azimuthal, zonal slice. However, in this embodiment, the source housing 624 includes an internal baffle 640 within the housing cavity that redirects the light (not shown) within the source housing 624 to help establish a Lambertian distribution of the light within the source housing 624. The size and shape of the baffle 640 can be varied, and the shapes provided herein are merely non-exclusive examples of possible baffle 640 designs. In FIG. 6, the baffle 640 is spherical shaped ball shaped, has axial symmetry, and is positioned in the center of the source housing 624.

Figure 7:
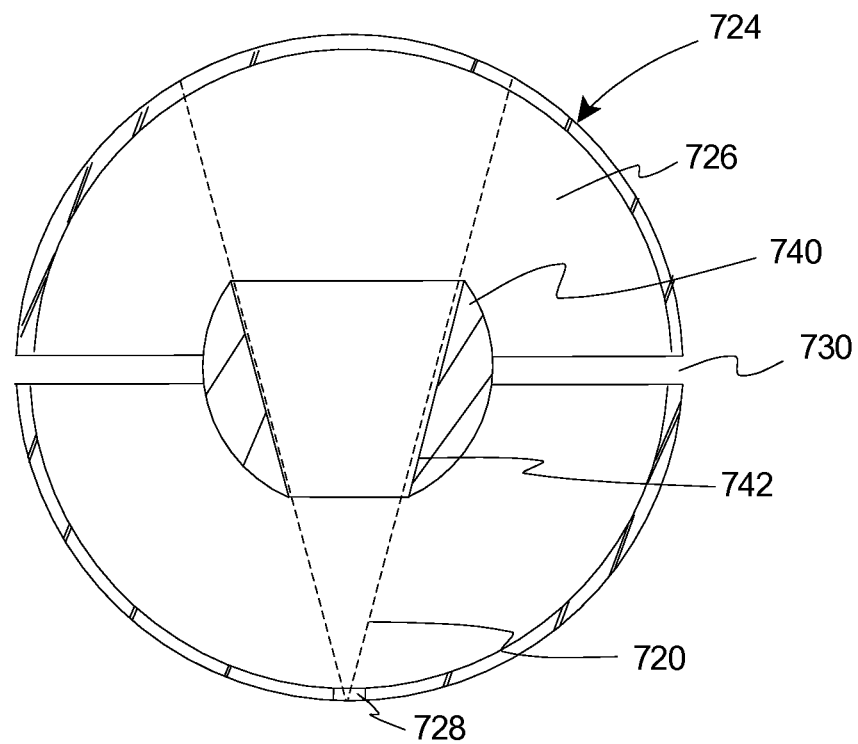
FIG. 7 is a simplified cut-away view of still another embodiment of a source housing having features of the present invention.

FIG. 7 is a cut-away view that illustrates another embodiment of the housing 724 that is somewhat similar to the source housing 624 described above and illustrated in FIG. 6. In this embodiment, the source housing 724 is again hollow spherical shaped, includes a single outlet port 730 that is an azimuthal, zonal slice, and the source housing 724 includes an internal baffle 740 within the housing cavity 726 that redirects the light 720 within the source housing 724. In this embodiment, the baffle 740 is shaped similar to a spherical ball that includes a tapered, cylindrical shaped internal baffle passageway 742 that extends vertically through the baffle 740. With this design, the bulk of the light 720 directed into the housing cavity 726 via the inlet port 728 passes through the baffle passageway 742 and impinges on and is reflected off of the top of the housing cavity 726.

Figure 8:
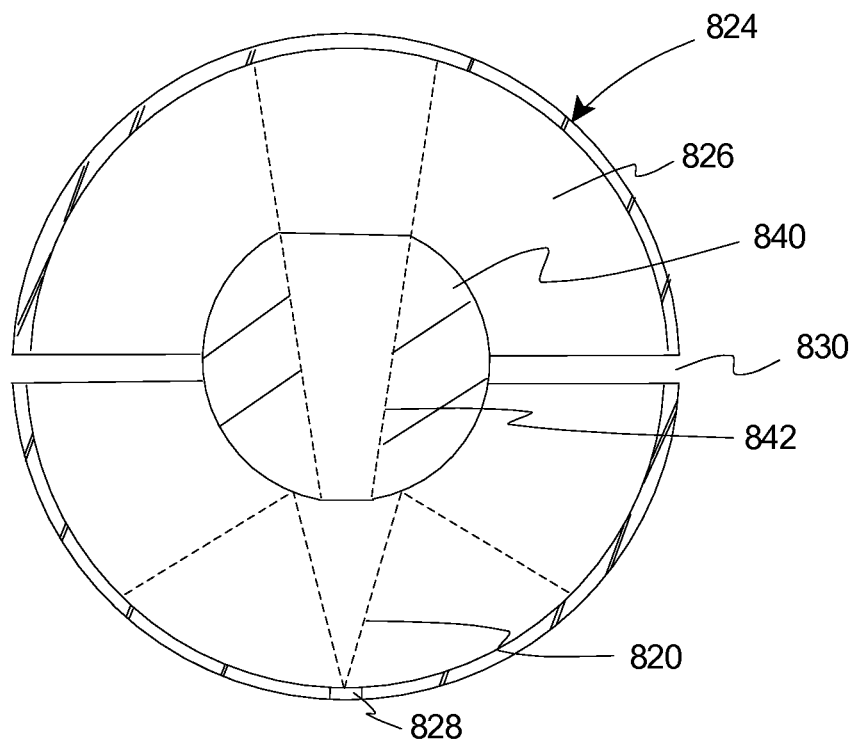
FIG. 8 is a simplified cut-away view of another embodiment of a source housing having features of the present invention.

FIG. 8 is a cut-away view that illustrates yet another embodiment of the housing 824 that is somewhat similar to the source housing 724 described above and illustrated in FIG. 7. In this embodiment, the source housing 824 is again hollow spherical shaped, includes a single outlet port 830 that is an azimuthal, zonal slice, and the source housing 824 includes an internal baffle 840 within the housing cavity 826 that redirects the light 820 within the source housing 824. In this embodiment, the baffle 840 is shaped similar to a spherical ball that includes a tapered, cylindrical shaped internal baffle passageway 842 that extends vertically. However, in this embodiment, the baffle passageway 842 has a smaller shape than the baffle passageway 742 illustrated in FIG. 7. With this design, (i) a portion of the light 820 directed into the housing cavity 826 via the inlet port 828 passes through the baffle passageway 842 and impinges on and is reflected off of the top of the housing cavity 826, and (ii) a portion of the light 820 directed into the housing cavity 826 via the inlet port 828 is reflected off of the bottom of the baffle 840.

Figure 9:
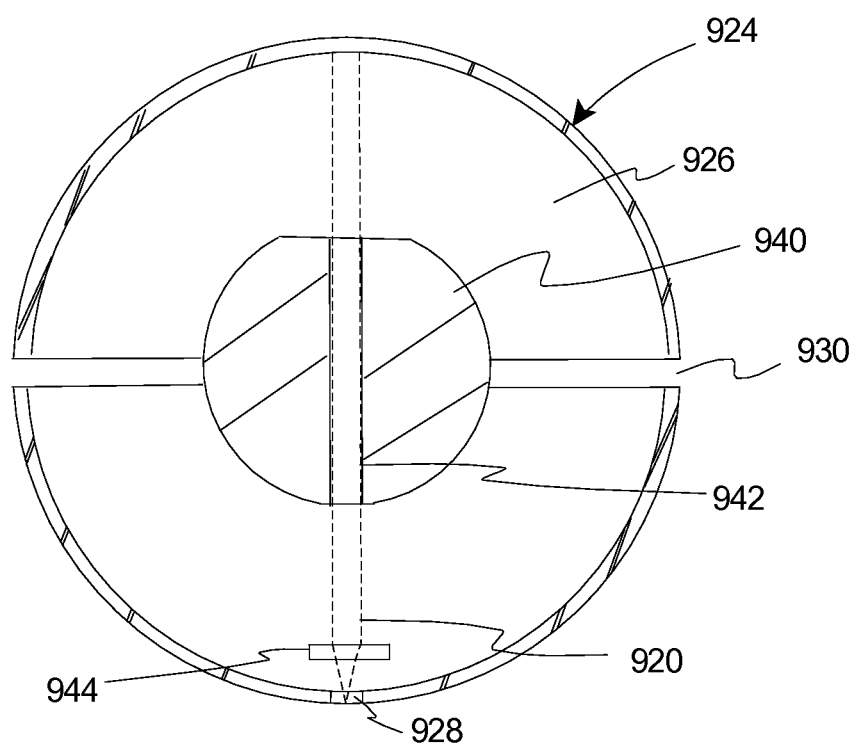
FIG. 9 is a simplified cut-away view of yet another embodiment of a source housing having features of the present invention.

FIG. 9 is a cut-away view that illustrates yet another embodiment of the housing 924 that is somewhat similar to the source housing 824 described above and illustrated in FIG. 8. In this embodiment, the source housing 924 is again hollow spherical shaped, includes a single outlet port 930 that is an azimuthal, zonal slice, and the source housing 924 includes an internal baffle 940 within the housing cavity 926 that redirects the light 920 within the source housing 924. In this embodiment, the baffle 940 is shaped similar to a spherical ball that includes a small cylindrical shaped internal baffle passageway 942 that extends vertically. Moreover, in the embodiment, the source housing 924 includes an interior lens 944 positioned below the baffle passageway 942. With this design, the light 920 directed into the housing cavity 926 via the inlet port 928 is collimated and focused by the lens 944 so that the light 920 passes through the baffle passageway 942 to impinge on and be reflected off of the top of the housing cavity 926.

It should be noted that any of the internal baffle 640, 740, 840, 949 design can be used with the source housing 224 that includes a plurality of outlet ports 230.

Figure 10A:
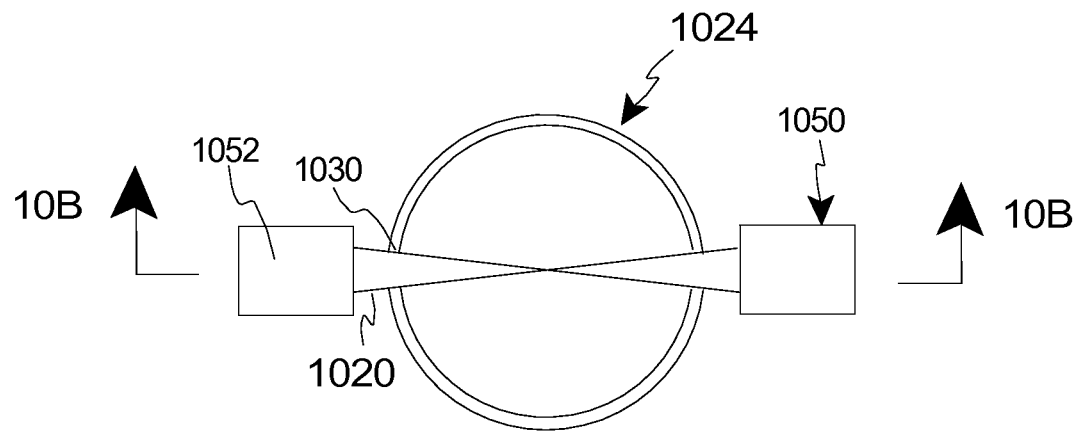
FIGS. 10A and 10B are alternative, simplified cut-away views of still another embodiment of a source housing having features of the present invention.
Figure 10B:
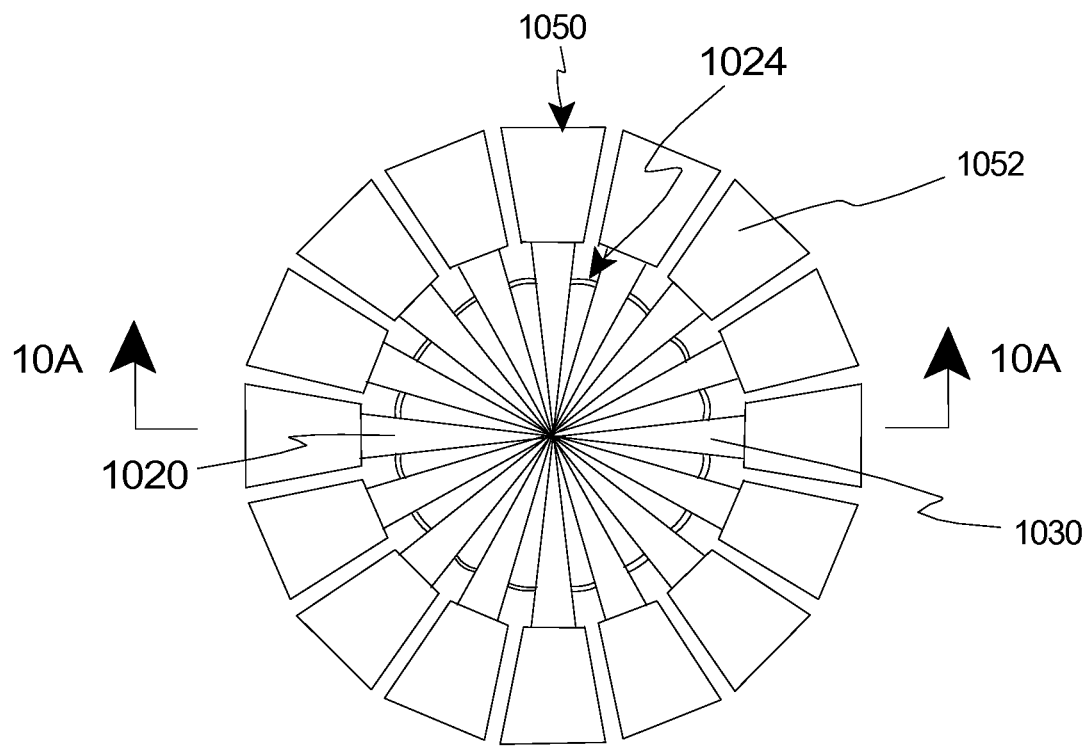

FIGS. 10A and 10B are alternative, simplified cut-away views of still another embodiment of a source housing 1024 that is somewhat similar to the source housing 224 described above and illustrated in FIGS. 2A and 2B. In this embodiment, the source housing 1024 is again hollow spherical shaped, and includes a plurality of spaced apart outlet ports 1030.

However, in this embodiment, the assembly includes an external lens assembly 1050 that is positioned adjacent to the outlet ports 1030. More specifically, in this embodiment, the lens assembly 1050 includes a separate lens 1052 (or other optical system) that is positioned adjacent to and on the outside of each outlet port 1030. In this embodiment, the lenses 1052 are equally spaced apart around the perimeter of the source housing 1024 near the outlet ports 1030 and the lens assembly 1050 encircles the source housing 1024 near the outlet ports 1030. With this design, light 1020 exiting each outlet port 1030 passes through one of the lens 1052. With this design, the light 1020 exiting the source housing 1024 is collimated and focused by the lens assembly 1050. The optical properties of the lens assembly 1050 may be different in the vertical and azimuthal planes.

Figure 11A:
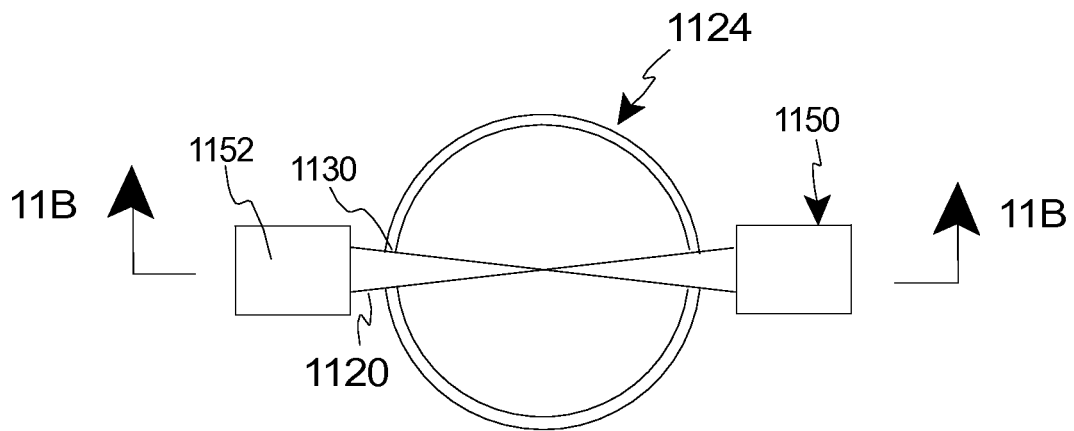
FIGS. 11A and 11B are alternative, simplified cut-away views of yet another embodiment of a source housing having features of the present invention.
Figure 11B:
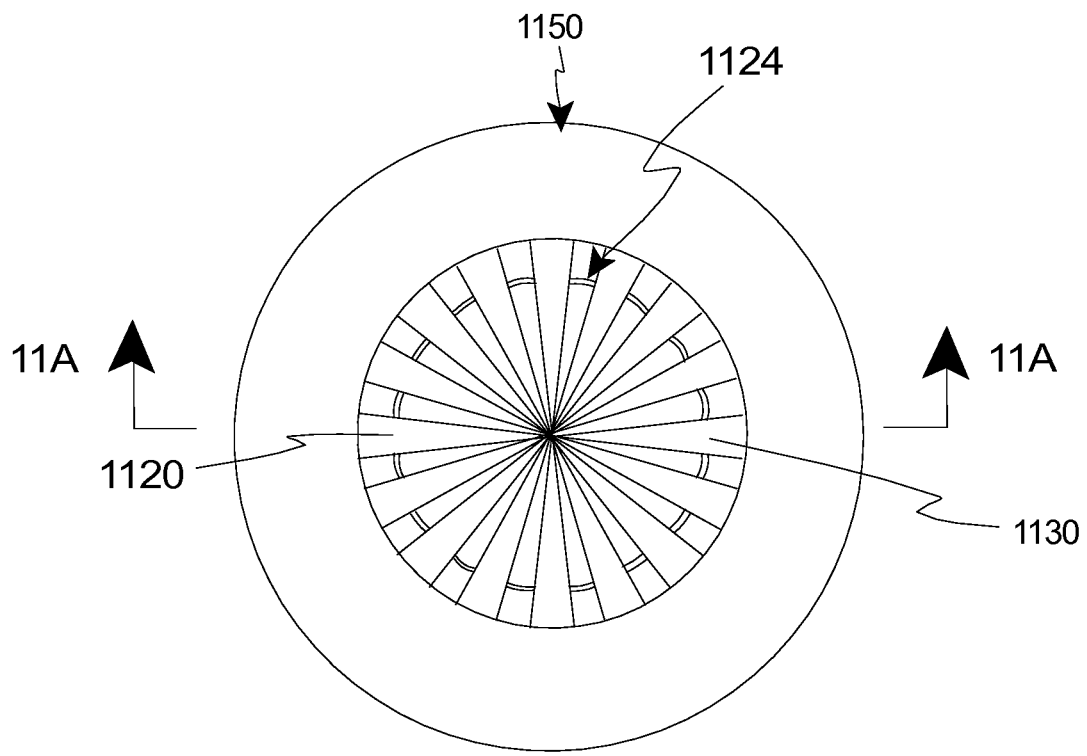

FIGS. 11A and 11B are alternative, simplified cut-away views of still another embodiment of a source housing 1124 that is somewhat similar to the source housing 1024 described above and illustrated in FIGS. 10A and 10B. In this embodiment, the source housing 1124 is again hollow spherical shaped, and includes a plurality of spaced apart outlet ports 1130. Further, in this embodiment, the assembly includes an external lens assembly 1150 that is positioned adjacent to the outlet ports 1130. However, in this embodiment, the lens assembly 1150 includes an annular shaped lens 1152 (or other optical system) that is positioned adjacent to and on the outside of the slit shaped outlet ports 1030. Further, the lens assembly 1150 encircles the source housing 1124 near the outlet ports 1130. With this design, light 1120 exiting each outlet port 1130 passes through the lens assembly 1150. With this design, the light 1120 exiting the source housing 1124 is collimated and focused by the lens assembly 1150.

It should be noted that the lens assembly 1150 design of FIGS. 11A and 11B can be used with the source housing 524 (illustrated in FIG. 5) having a single outlet port 530 that is an azimuthal, zonal slice.

Referring back to FIGS. 2A, 2B, 3A, 3B, 4A and 4B, for some of the embodiments provided herein, the modulation of the flash of light 220 from a given outlet port 230, caused by the effects of the other outlet ports 230, is enhanced, because the dips in intensity, caused by the absence of reflected light from the other ports, overlap when the light 220 from adjacent outlet ports 230 is added in the far field. This effect can be reduced by randomly shifting the outlet ports 230 around, so light from different outlet ports 230 average out some of the modulation. In certain embodiments, as provided herein, the light 220 from only approximately five outlet ports 230 overlaps at far field, so a contrast of approximately one-fifth may remain.

Figure 12:
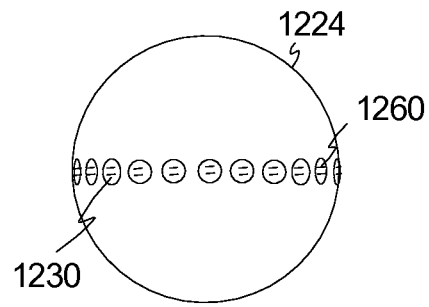
FIG. 12 is a side view of yet another embodiment of a source housing.

FIG. 12 is a side view of yet another embodiment of a source housing 1224 that is somewhat similar to the source housing 224 described above and illustrated in FIGS. 2A and 2B. However, in this embodiment, one or more of the outlet ports 1230 are partly or fully covered with a translucent film 1260. For example, the translucent film 1260 can scatter the light by approximately one to two degrees. This will fill in the dark regions.

Figure 13:
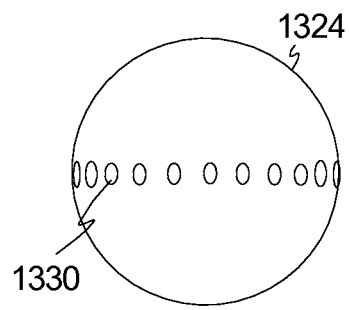
FIG. 13 is a side view of still another embodiment of a source housing.

FIG. 13 is a side view of yet another embodiment of a source housing 1324 that is somewhat similar to the source housing 224 described above and illustrated in FIGS. 2A and 2B. However, in this embodiment, the outlet ports 1330 are elliptical shaped. For a given total output port 1330 area, the azimuthal width of the outlet ports 1330 is reduced, by making them elliptical, with the long axis vertical instead of circular. One advantage of the elliptic outlet ports 1330 is that it is a little easier to achieve the minimum contrast than with circular outlet ports 1230 (illustrated in FIG. 12).

Also, for larger numbers of outlet ports 1230, the circular outlet ports 1230 start to overlap. Stated in another fashion, as provided herein, contrast can be reduced by increasing the number of outlet ports 1230. When the angular spacing of the outlet ports 1330 is reduced, more of them contribute to a given point in the far field.

Another way to improve radiation uniformity in the far field is to reduce the fraction f of the spherical cavity area represented by the exit ports. Using the formulae given in Table 1, it can be shown that the angle subtended by a port on the opposite side of the spherical cavity, th_port (angular size of the port at the opposite side of the sphere), is reduced. This will reduce the modulation of intensity at the port, caused by the absence of reflected radiation from an opposite port. Also, the maximum number of circular ports possible without overlap increases, allowing more ports to contribute to the far field in a given direction. This allows more averaging of modulations from individual ports. The peak power from a port is reduced, but this is at least partially compensated by the additional number of ports contributing at the far field. As provided herein, Nport represents the total number of ports for the source housing.

Figure 14:
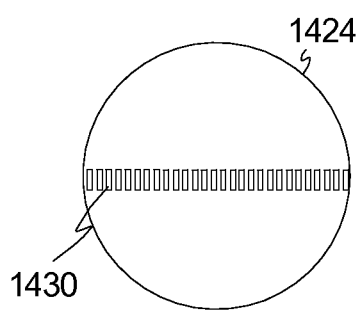
FIG. 14 is a side view of another embodiment of a source housing.

FIG. 14 is a side view of still another embodiment of a source housing 1424 that is somewhat similar to the source housing 224 described above and illustrated in FIGS. 2A and 2B. In this embodiment, the outlet ports 1430 are slit shaped to form a large number of narrow slits. The diffraction from this design will fill in the dark regions.

The embodiments described above can provide an azimuthally uniform radiation distribution. The use of an integrating sphere provides a convenient means of generating this distribution, as well as providing a radiation distribution in the elevation direction which is approximately Lambertian. More general shapes possessing azimuthal symmetry can provide a uniform azimuthal radiation distribution as well, although the radiation distribution in the elevation direction may not be Lambertian, and may require the use of internal baffles to obtain a desired distribution. Some examples of more general shapes include a cylinder, a cone or an ellipsoid of revolution, whose axes of symmetry are normal to the azimuthal plane.

Next, explanations will be made with respect to a structure manufacturing system that can utilize the measuring apparatus 10 (large metrology system) described hereinabove.

Figure 15:
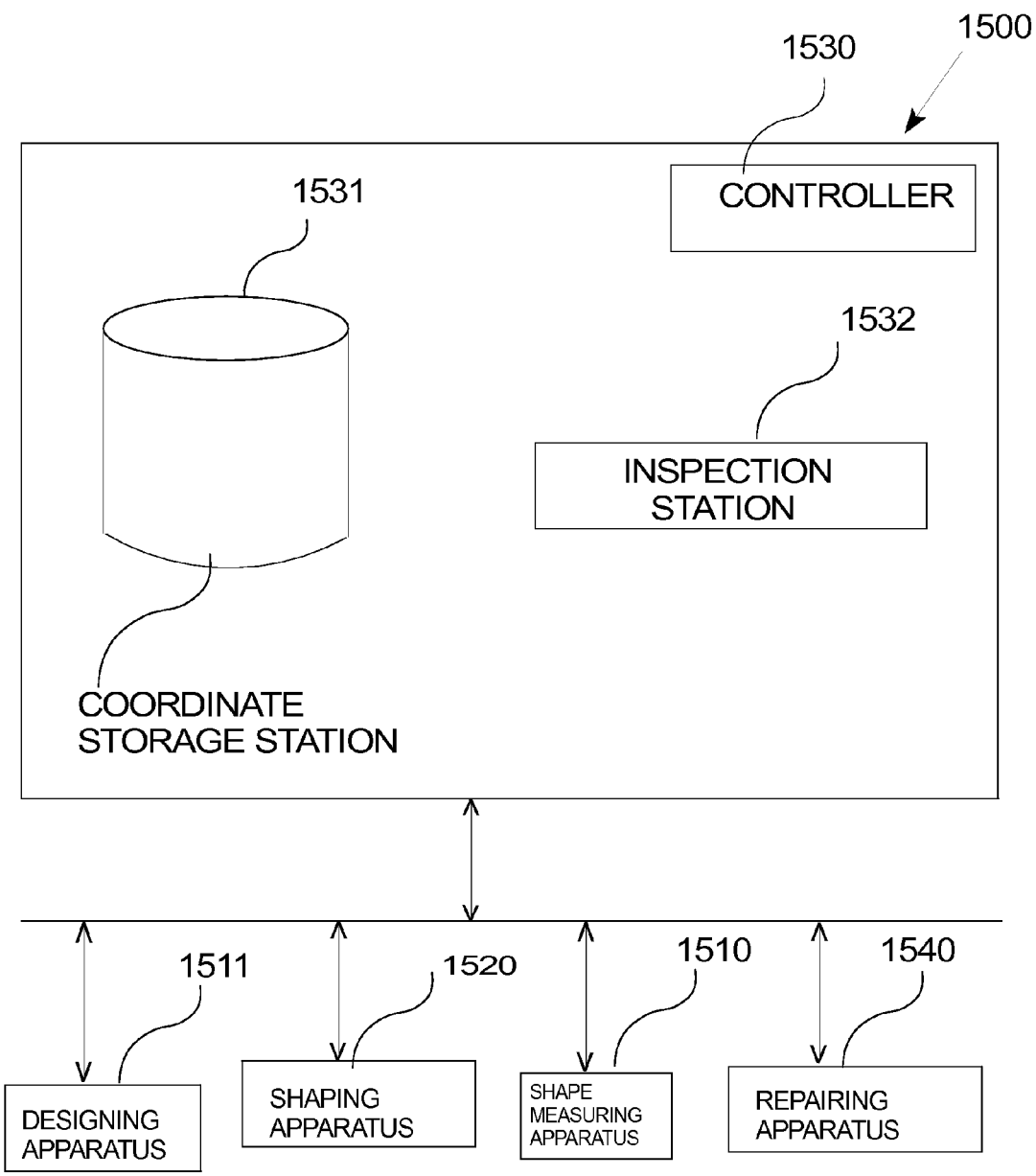
FIG. 15 is a block diagram of a structure manufacturing system having features of the present invention.

More specifically, FIG. 15 is a block diagram of one embodiment of a structure manufacturing system 1500. The structure manufacturing system 1500 can be used for producing at least a structure (e.g. an object) from at least one material. The structure can be any kind of part or assembly, such as part of a ship, a part of an airplane, or another kind of part.

In one embodiment, the structure manufacturing system 1500 includes (i) a profile measuring apparatus 1510 (e.g. the metrology system 10 as described herein above); (ii) a designing apparatus 1511; (iii) a shaping apparatus 1520, (iv) a controller 1530 (inspection apparatus); and (v) a repairing apparatus 1540. The controller 1530 includes a coordinate storage section 1531 and an inspection station 1532.

The designing apparatus 1511 creates design information with respect to the shape of a structure and sends the created design information to the shaping apparatus 1520. Further, the designing apparatus 1511 causes the coordinate storage section 1531 of the controller 1530 to store the created design information. The design information includes information indicating the coordinates of each position of the structure.

The shaping apparatus 1520 produces the structure based on the design information inputted from the designing apparatus 1511. The shaping process by the shaping apparatus 1520 includes such as casting, forging, cutting, and the like. The profile measuring apparatus 1510 measures the coordinates of the produced structure (measuring object) and sends the information indicating the measured coordinates (shape information) to the controller 1530.

The coordinate storage section 1531 of the controller 1530 stores the design information. The inspection section 1532 of the controller 1530 reads out the design information from the coordinate storage section 1531. The inspection section 1532 compares the information indicating the coordinates (shape information) received from the profile measuring apparatus 1510 with the design information read out from the coordinate storage section 1531. Based on the comparison result, the inspection section 1532 determines whether or not the structure is shaped in accordance with the design information. In other words, the inspection section 1532 determines whether or not the produced structure is defective. When the structure is not shaped in accordance with the design information, then the inspection section 1532 determines whether or not the structure is repairable. If repairable, then the inspection station 1532 calculates the defective portions and repairing amount based on the comparison result, and sends the information indicating the defective portions and the information indicating the repairing amount to the repairing apparatus 1540.

The repairing apparatus 1540 performs processing of the defective portions of the structure based on the information indicating the defective portions and the information indicating the repairing amount received from the controller 630.

Figure 16:
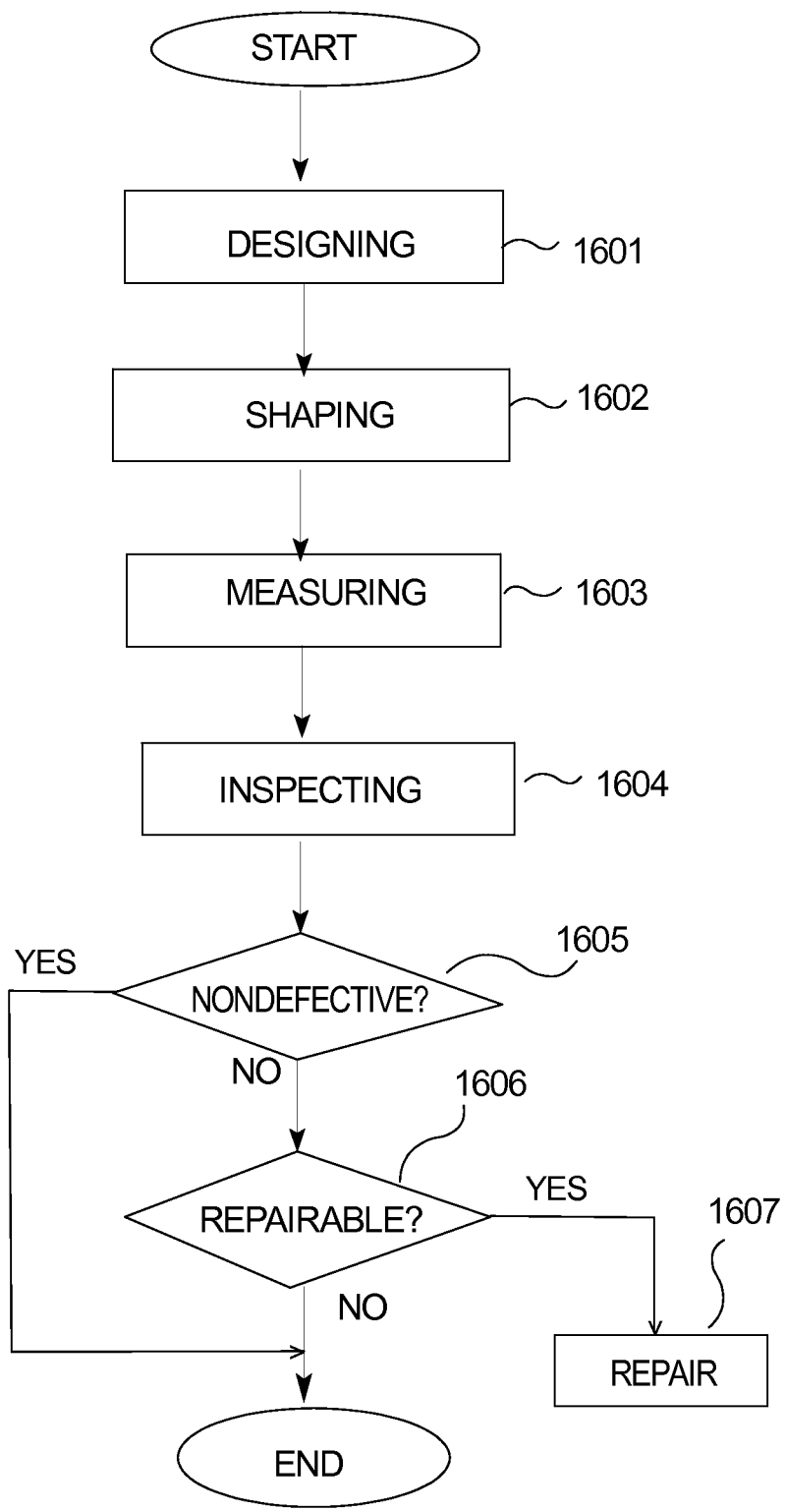
FIG. 16 is a flowchart showing processing flow of the structure manufacturing system of FIG. 15.

FIG. 16 is a flowchart showing a processing flow of the structure manufacturing system 1500. With respect to the structure manufacturing system 1500, first, the designing apparatus 1511 creates design information with respect to the shape of a structure (step 1601). Next, the shaping apparatus 1520 produces the structure based on the design information (step 1602). Then, the profile measuring apparatus 1510 measures the produced structure to obtain the shape information thereof (step 1603). Then, the inspection station 1532 of the controller 1530 inspects whether or not the structure is produced truly in accordance with the design information by comparing the shape information obtained from the profile measuring apparatus 1510 with the design information (step 1604).

Then, the inspection portion 1532 of the controller 1530 determines whether or not the produced structure is nondefective (step 1605). When the inspection section 1532 has determined the produced structure to be nondefective ("YES" at step 1605), then the structure manufacturing system 1500 ends the process. On the other hand, when the inspection section 1532 has determined the produced structure to be defective ("NO" at step 1605), then it determines whether or not the produced structure is repairable (step 1606).

When the inspection portion 1532 has determined the produced structure to be repairable ("YES" at step 1606), then the repair apparatus 1540 carries out a reprocessing process on the structure (step 1607), and the structure manufacturing system 1510 returns the process to step 1603. When the inspection portion 1532 has determined the produced structure to be unrepairable ("NO" at step 1606), then the structure manufacturing system 1510 ends the process. With that, the structure manufacturing system 1510 finishes the whole process shown by the flowchart of FIG. 16.

With respect to the structure manufacturing system 1600 of the embodiment, because the profile measuring apparatus 1510 in the embodiment can correctly measure the coordinates of the structure, it is possible to determine whether or not the produced structure is defective. Further, when the structure is defective, the structure manufacturing system 1600 can carry out a reprocessing process on the structure to repair the same.

Further, the repairing process carried out by the repairing apparatus 1540 in the embodiment may be replaced such as to let the shaping apparatus 1520 carry out the shaping process over again. In such a case, when the inspection section 1532 of the controller 1530 has determined the structure to be repairable, then the shaping apparatus 1520 carries out the shaping process (forging, cutting, and the like) over again. In particular for example, the shaping apparatus 1520 carries out a cutting process on the portions of the structure which should have undergone cutting but have not. By virtue of this, it becomes possible for the structure manufacturing system 1600 to produce the structure correctly.

In the above embodiment, the structure manufacturing system 1500 includes the profile measuring apparatus 1510, the designing apparatus 1511, the shaping apparatus 1520, the controller 1530 (inspection apparatus), and the repairing apparatus 1540. However, present teaching is not limited to this configuration. For example, a structure manufacturing system 1600 in accordance with the present can be used for assembling the structure and/or assembling multiple structures.

It is to be understood that invention disclosed herein are merely illustrative of the presently preferred embodiments of the invention and that no limitations are intended to the details of construction or design herein shown other than as described in the appended claims.

What is claimed is:

1. A transmitter for use in a metrology system, the transmitter comprising:
    a beam generator that generates a pair of moving beams; and
    a stroboscopic light source including (i) a source housing that defines a housing cavity, the source housing including an inlet port and an outlet port; and (ii) a pulsed light generator that generates a pulsed beam that is directed into the housing cavity via the inlet port, the pulsed beam emitting from the outlet port of the source housing.

2. The transmitter of claim 1 wherein the stroboscopic light source further comprises an optical fiber that transmits the pulsed beam from the pulsed light generator to the inlet port.

3. The transmitter of claim 1 wherein the housing cavity is spherical shaped.

4. The transmitter of claim 3 wherein the source housing includes an azimuthal array of outlet ports.

5. The transmitter of claim 3 wherein the outlet port is an azimuthal slit.

6. The transmitter of claim 1 wherein the source housing includes an internal baffle.

7. The transmitter of claim 1 further comprising a transmitter head that rotates about a first axis, the transmitter head including a first head aperture and a second head aperture, wherein one of the moving beams is emitted through the first head aperture, and wherein the other of the moving beams is emitted through the second head aperture.

8. A metrology system that monitors the position or shape of a structure, the metrology system comprising: a target adapted to be positioned near the structure, and the transmitter of claim 1, wherein the pair of moving beams scan across the target, and wherein the stroboscopic light source emits the pulsed beam toward the target.

9. A method for manufacturing a structure, the method comprising the steps of: producing the structure based on design information; obtaining shape information of the structure with the metrology system of claim 8; and comparing the obtained shape information with the design information.

10. The method of claim 9 further comprising the step of reprocessing the structure based on the comparison result.

11. A metrology system that monitors the position or shape of a structure, the metrology system comprising:
    a target adapted to be positioned near the structure;
    a beam generator that generates a pair of moving beams that scan across the target;
    a transmitter head that rotates about a first axis, the transmitter head including a first head aperture and a second head aperture, wherein one of the moving beams is emitted through the first head aperture, and wherein the other of the moving beams is emitted through the second head aperture; and
    a stroboscopic light source including (i) a source housing that defines a substantially spherical shaped housing cavity, the source housing including an inlet port and an outlet port; (ii) a pulsed light generator that generates a pulsed beam that is directed into the housing cavity via the inlet port; and (iii) an optical fiber that transmits the pulsed beam from the pulsed light generator to the inlet port of the housing cavity; and
    wherein the stroboscopic light source emits the pulsed beam from the outlet port of the source housing toward the target.

12. The metrology system of claim 11 wherein the source housing includes an internal baffle.

13. A method for manufacturing a structure, the method comprising the steps of: producing the structure based on design information; obtaining shape information of the structure with the metrology system of claim 11; and comparing the obtained shape information with the design information.

14. The method of claim 13 further comprising the step of reprocessing the structure based on the comparison result.

15. A method for monitoring the position or shape of a structure, the method comprising the steps of:
    positioning a target near the structure;
    generating a pair of moving beams that scan across the target with a beam generator;
    providing a source housing that defines a housing cavity, the source housing including an inlet port and an outlet port;
    generating a pulsed beam that is directed into the housing cavity via the inlet port with a pulsed light generator; and
    emitting the pulsed beam from the outlet port of the source housing toward the target.

16. The method of claim 15 wherein the step of generating the pulsed beam includes the step of transmitting the pulsed beam from the pulsed light generator to the inlet port of the housing cavity via an optical fiber.

17. The method of claim 15 wherein the step of providing a source housing includes the source housing having an internal baffle.

18. The method of claim 15 further providing the steps of rotating a transmitter head about a first axis, the transmitter head including a first head aperture and a second head aperture; emitting one of the moving beams through the first head aperture; and emitting the other of the moving beams through the second head aperture.

19. The method of claim 15 further comprising the steps of receiving information from the target with a control system, and determining the position of the target relative to the source housing with the control system.

20. A method for manufacturing a structure, the method comprising the steps of: producing the structure based on design information; obtaining shape information of the structure with the method of claim 15; and comparing the obtained shape information with the design information.

* * * * *